US012731918B2

(12) United States Patent
Fuerholzer

(10) Patent No.: US 12,731,918 B2
(45) Date of Patent: Sep. 8, 2026

(54) CLAMPING BODY AND CONNECTING TERMINAL FOR AN ELECTRIC CONDUCTOR

(71) Applicant: Siemens Aktiengesellschaft, Munich (DE)

(72) Inventor: Roland Fuerholzer, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 18/689,635

(22) PCT Filed: Jun. 28, 2022

(86) PCT No.: PCT/EP2022/067637
§ 371 (c)(1),
(2) Date: Mar. 6, 2024

(87) PCT Pub. No.: WO2023/036483
PCT Pub. Date: Mar. 16, 2023

(65) Prior Publication Data
US 2025/0125543 A1 Apr. 17, 2025

(30) Foreign Application Priority Data
Sep. 9, 2021 (EP) ..................................... 21195746

(51) Int. Cl.
*H01R 4/48* (2006.01)

(52) U.S. Cl.
CPC ....... *H01R 4/4821* (2023.08); *H01R 4/48185* (2023.08); *H01R 4/484* (2023.08); *H01R 4/4848* (2023.08)

(58) Field of Classification Search
CPC .... H01R 4/4821; H01R 4/484; H01R 4/4848; H01R 4/48185
(Continued)

(56) References Cited

U.S. PATENT DOCUMENTS 4,978,315 A * 12/1990 Edgley ................. H01R 4/4848 439/441
6,132,239 A * 10/2000 Nærland .................. H01R 4/26 439/441
(Continued)

FOREIGN PATENT DOCUMENTS

CN 110492256 11/2019
DE 2900673 7/1980
(Continued)

OTHER PUBLICATIONS

PCT International Search Report dated Sep. 23, 2022 based on PCT/EP2022/067637 filed Jun. 28, 2022.

*Primary Examiner* — Gary F Paumen
(74) *Attorney, Agent, or Firm* — Cozen O'Connor

(57) ABSTRACT

A clamping body formed from an integral sheet-metal punched part by bending processes, wherein the sheet-metal punched part has a central portion, upon which a spring arm portion is arranged on a first side and a contact-pressure surface portion on a second side, and, starting from the central portion, the spring arm portion is divided into a first part and an adjoining second part with a free end, where the first part is bent upwards, the second part is bent downwards and the contact-pressure surface portion is bent upwards, where the central portion lies opposite the opening, the downwardly bent second part forms a guide surface for the plug-in part to be plugged in within an opening, the first part exerts a spring force in the direction of the contact-pressure surface portion, so that a plug-in part plugged in via the guide surface is secured.

4 Claims, 7 Drawing Sheets

(58) Field of Classification Search
USPC ........................................ 439/733.1, 441, 858
See application file for complete search history.

(56) References Cited

U.S. PATENT DOCUMENTS

| | | | | |
|---|---|---|---|---|
| 6,428,343 | B1 | 8/2002 | Landis et al. | |
| 6,548,761 | B1 * | 4/2003 | Wang | H01R 4/22 439/441 |
| 8,721,376 | B1 * | 5/2014 | Bishop | H01R 12/515 439/441 |
| 8,771,004 | B2 * | 7/2014 | Fehling | H01R 4/4814 439/441 |
| 8,882,533 | B2 * | 11/2014 | Brandberg | H01R 4/4833 439/441 |
| 9,735,515 | B2 | 8/2017 | Wu et al. | |
| 2011/0207372 | A1 | 8/2011 | Breen, IV | |
| 2014/0120783 | A1 * | 5/2014 | Bishop | H01R 12/515 439/744 |

FOREIGN PATENT DOCUMENTS

| | | |
|---|---|---|
| DE | 29914482 | 1/2001 |
| EP | 3118938 | 1/2017 |

* cited by examiner

CLAMPING BODY AND CONNECTING TERMINAL FOR AN ELECTRIC CONDUCTOR

CROSS-REFERENCE TO RELATED APPLICATIONS

This is a U.S. national stage of application No. PCT/EP2022/067637 filed 28 Jun. 2022. Priority is claimed on European Application No. 21195746.9 filed 9 Sep. 2021, the content of which is incorporated herein by reference in its entirety.

BACKGROUND OF THE INVENTION

1. Field of the Invention

The invention relates to the use of terminals for establishing electrical contact between conductors and the terminal, where it is advantageous if the conductor is detachably connected to the terminal and, more specifically, relates to a clamping body with an opening for a plug-in part, which is formed from an integral sheet-metal punched part by bending processes, and also relates to a connecting terminal for an electrical conductor as a plug-in part having the clamping body.

2. Description of the Related Art

EP 3 118 938 A1, US 2011/0207372 A1 and U.S. Pat. No. 9,735,515 B2 respectively disclose connecting terminals with clamping bodies, with which contact can be made with electrical conductors. It is disadvantageous in the subject matters of these disclosures that a tool is respectively required for removing the conductor from the terminal.

U.S. Pat. No. 6,428,343 B1 discloses a connecting terminal with spring arms in which a tool still must be used to remove a conductor.

DE 29 00 673 A1 discloses a connecting terminal with bent spring arms in which a tool can be omitted.

SUMMARY OF THE INVENTION

It is an object of the invention to provide a clamping body or a connecting terminal, which enables tool-free removal of a conductor from the connecting terminal and which provides a more secure retention when the conductor is plugged-in.

These and other objects and advantages are achieved in accordance with the invention by a clamping body with an opening for a plug-in part, which is formed from an integral sheet-metal punched part by bending processes, where the sheet-metal punched part has a central portion, upon which a spring arm portion is arranged on a first side and a contact surface portion is arranged on a second side, and starting from the central portion, the spring arm portion is formed as a first spring arm and as a second spring arm, the spring arms are arranged on the central portion in a V-shape and each spring arm is divided into a first part and an adjoining second part respectively with a free end and the respective first part is bent upwards almost vertically and the respective adjoining second part is arranged bent downwards again such that the respective free end opposes the contact surface portion which is likewise bent upwards almost vertically from the central portion. In addition, the respective downwardly bent second parts in the opening form first and second guide surfaces for the plug-in part to be plugged in, and the respective first part exerts a spring force respectively in the direction of the contact surface portion, whereby the plug-in part plugged-in via the guide surfaces is fixed, where the second part of the first spring arm is shorter than the second part of the second spring arm and as a result the respectively free ends oppose the contact surface portion that is likewise bent upwards almost vertically from the central portion at different locations. The disclosed embodiment accordingly provides clamping locations at different heights of the plugged-in conductor, which results in improved retention.

In the case of a conductor as a plug-in part, the conductor can accordingly be moved out of a clamping region of the clamping body via a simple pivoting movement and can then be pulled from a terminal box without resistance. The clamping body is preferably composed of a resilient metal sheet with low electrical resistance. This sheet is cut to size or punched and bent such that a funnel-shaped structure results into which either a rigid conductor or a flexible conductor with a wire sleeve can be introduced.

The conductor can be plugged, for example, in an axial direction, into the funnel where, in this embodiment, it is pressed by two spring elements onto a contact surface. Electrical contact between the conductor and the clamping body or the contact surface is established by this spring force. At the same time, sharp-edged ends of the free ends of the second parts respectively of the spring arms embed themselves in a surface of the conductor and consequently prevent the conductor from falling out of the clamping body.

The guide surfaces serve such that, via a pivoting movement of the plug-in part, the plug-in part lies parallel to the guide surfaces and exerts a force counter to the spring forces, whereby the plug-in part can be removed from the opening tool-free.

For improved capacity for contact, the respectively free ends have sharp-edged cutting edges.

The objects and advantages in accordance with the invention are also achieved by a connecting terminal for an electrical conductor as a plug-in part, having the clamping body in accordance with the disclosed embodiments, and having an insulating chamber in which the clamping body is arranged, where a cover is arranged on the insulating chamber over the opening and the cover has a recess with a circumferential line, and where starting from the circumferential line, a first web tapering in the direction of a center point of the recess and a tapering second web are arranged in a V-shape such that with a pivoting movement of the plugged-in conductor, the first web and the second web are widened by the conductor and when the conductor is no longer located between the webs they snap back and hold the conductor in an oblique position, achieved by the pivoting movement, for easy removal.

Because the first web and the second web more or less embrace the plugged-in conductor and can be easily widened by the pivoting movement and when the conductor is guided through the webs until they snap back, the first web and the second web form a blocking system. The conductor can accordingly be easily removed in this position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment of the invention, in which.

DETAILED DESCRIPTION OF THE EXEMPLARY EMBODIMENTS

Figure 1:
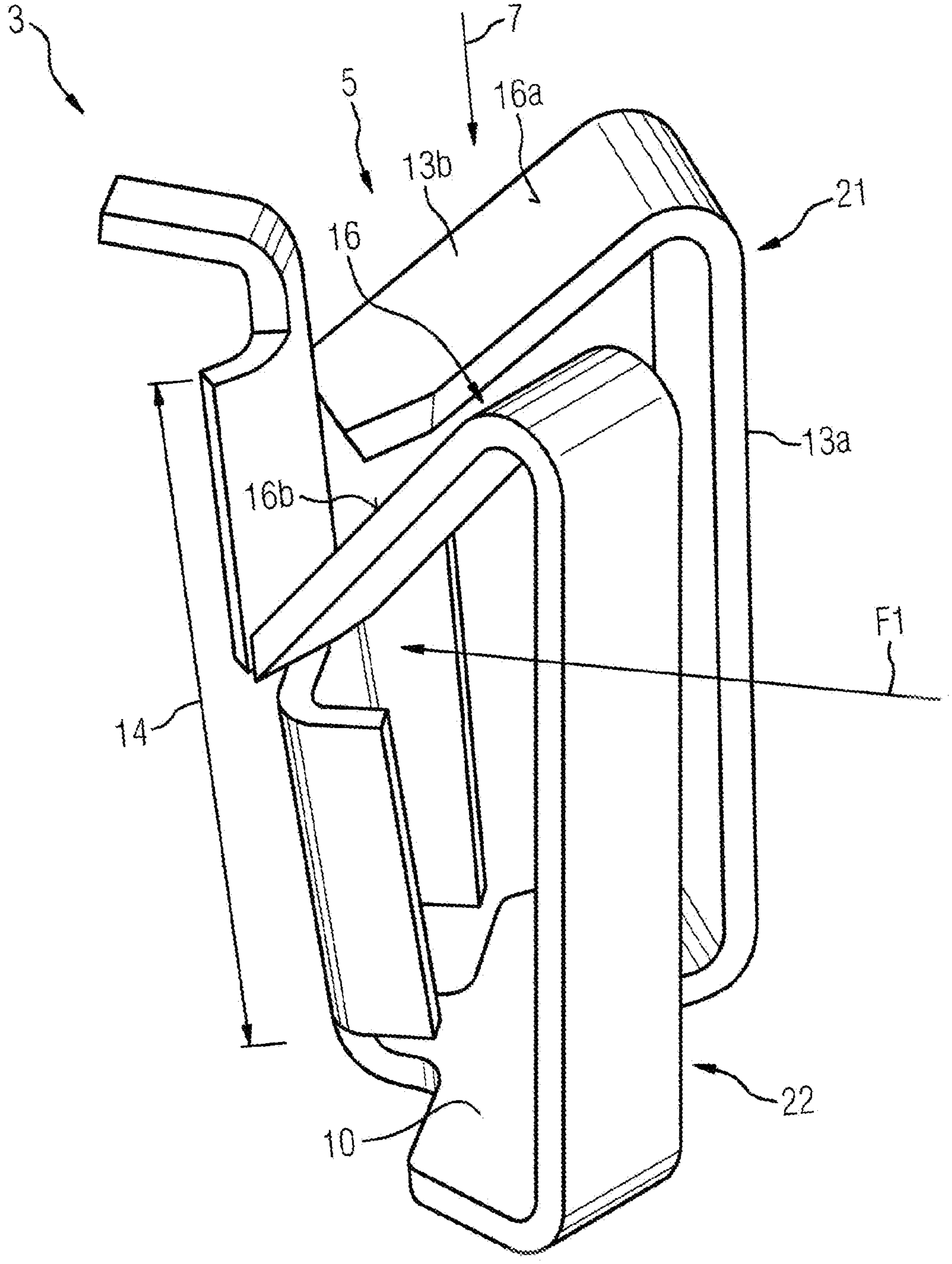
FIG. 1 shows a three-dimensional perspective representation of the clamping body in accordance with the invention.
Figure 6:
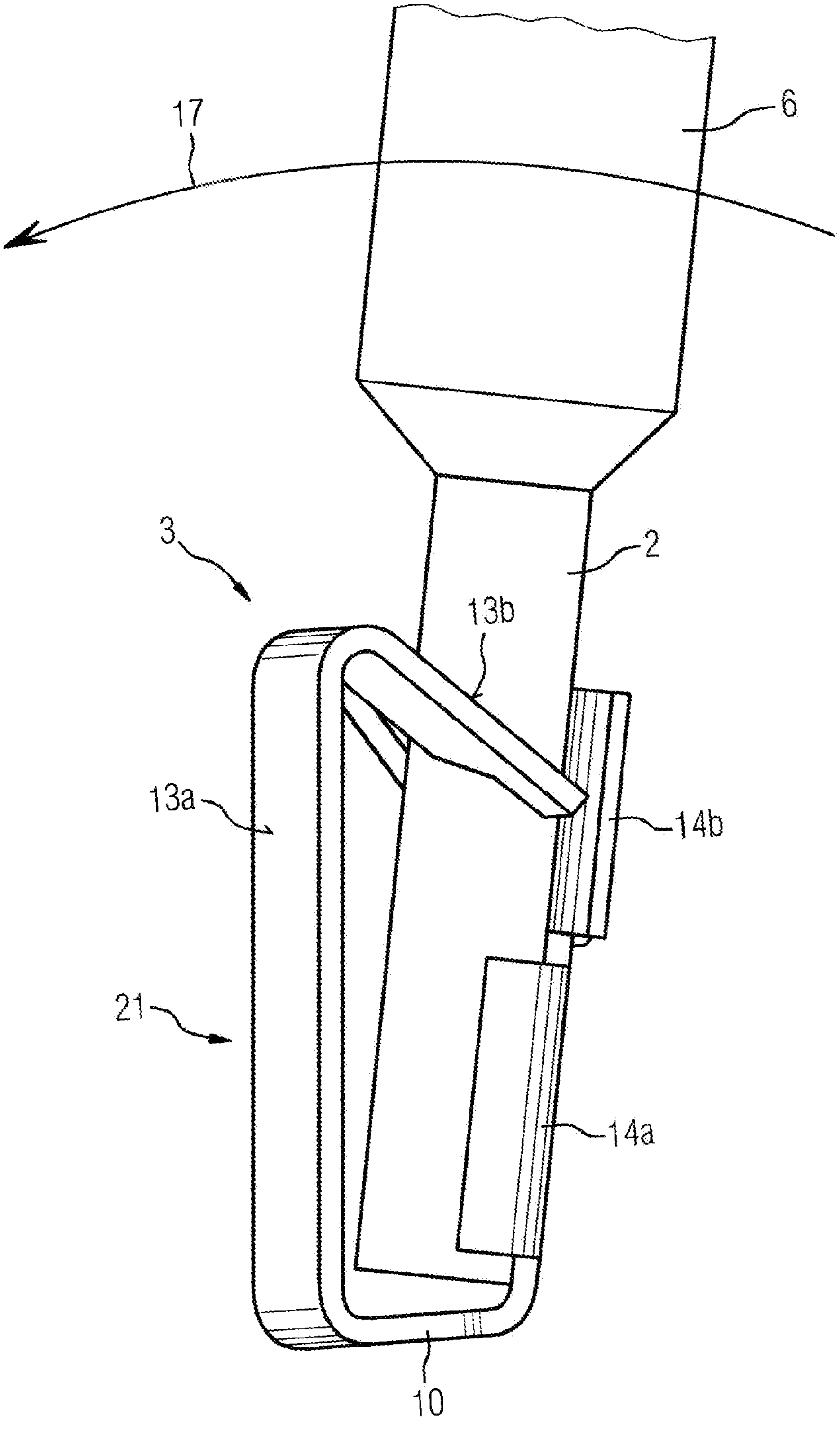
FIG. 6 shows the clamping body with a plugged-in wire sleeve as the conductor.
Figure 7:
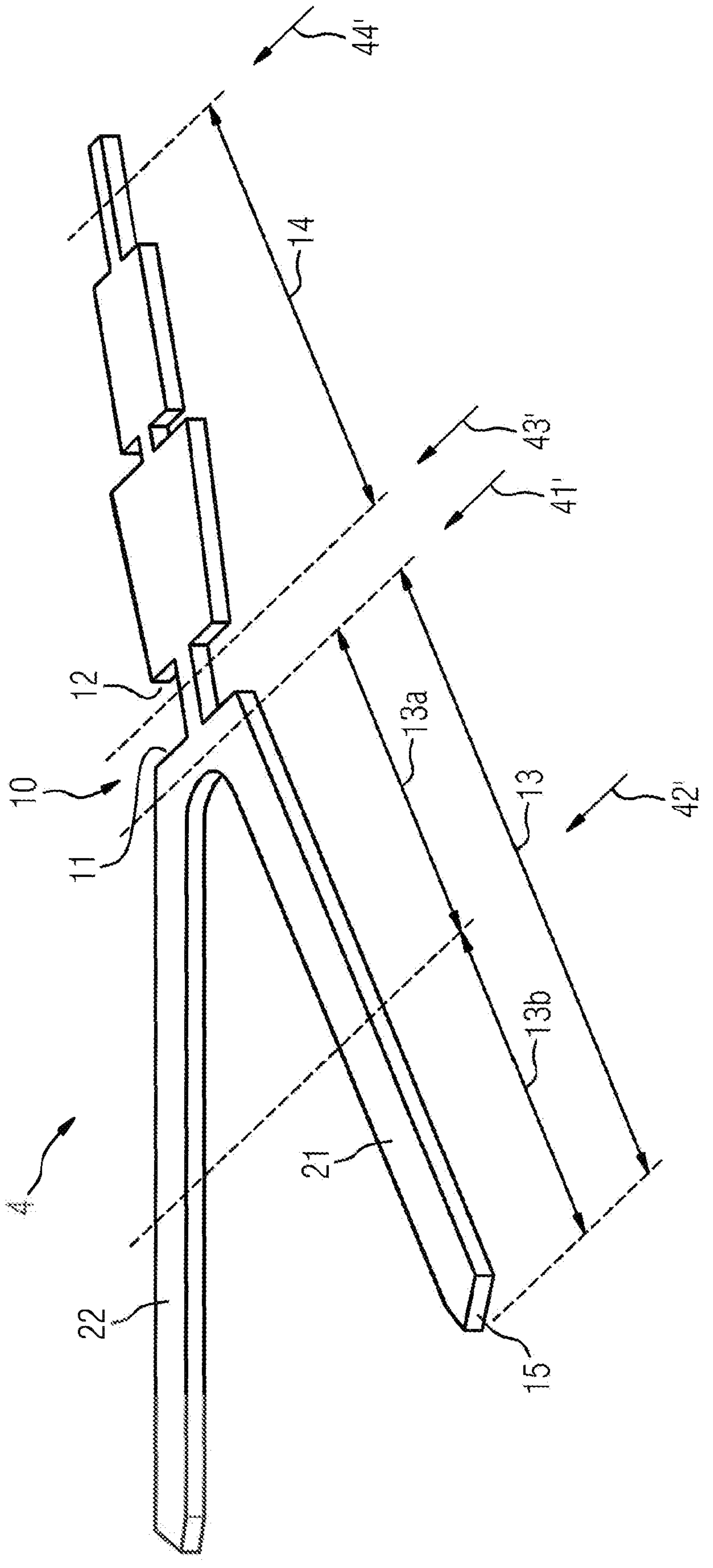
FIG. 7 shows the clamping body as a perspective representation of an implementation.

FIG. 1 represents a clamping body 3 with an opening 5 for a plug-in part 6 (see FIG. 6). The clamping body 3 is formed from an integral sheet-metal punched part 4 by bending processes. FIG. 7 will be used to explain the bending processes to achieve the end result of the clamping body 3. FIG. 7 shows the implementation of the clamping body 3 in a perspective representation.

FIG. 7 will be considered first of all in order to explain the development of the clamping body 3 by the bending processes in more detail. FIG. 7 shows a sheet-metal punched part 4, which has a central portion 10 upon which a spring portion 13 is arranged on a first side 11 and a contact surface portion 14 is arranged on a second side 12. Starting from the central portion 10, the spring arm portion 13 is divided into a first part 13*a* and a second part 13*b* with a free end 15. With continued reference to FIG. 7, the spring arm portion 13 is formed as a first spring arm 21 and a second spring arm 22, which are arranged on the central portion 10 in a V-shape and each spring arm 21,22 is divided respectively into a first part 13*a* and an adjoining second part 13*b* with one free end 15, respectively.

A contact surface portion 14 is arranged on the second side 12 of the central portion 10. So that the clamping body 3 in FIG. 1 can result by way of bending processes, a first bending line 41', a second bending line 42', a third bending line 43' and a fourth bending line 44' are drawn in the sheet-metal punched part 4, in FIG. 7, for the subsequent bending arcs 41,42,43,44.

The clamping body 3 in FIG. 1 accordingly results because the first part 13*a* is bent upwards almost vertically and the adjoining second part 13*b* is bent downwards again such that the free end 15 opposes the contact surface portion 14 that is likewise bent upwards almost vertically from the central portion 10. The central portion 10 is arranged opposite the opening 5. The downwardly bent second part 13*b* makes a guide surface 16 available in the opening 5 for the plug-in part 6 to be plugged in in a plug-in direction 7.

FIG. 1 represents an exemplary embodiment with a first spring arm 21 and a second spring arm 22. The inventive clamping body may also be implemented by just one spring arm 21,22, however, which is not described by a drawing in the exemplary embodiment here for purposes of clarity.

It is therefore regarded as essential to the invention that the downwardly bent second part 13*b* of a spring arm, irrespective of whether it is formed in a single spring arm configuration or in a double spring arm configuration, forms a guide surface for the plug-in part 6 to the plugged in, with the first part 13*a* exerting a spring force F1 in the direction of the contact surface portion 14, whereby a plug-in part 6 plugged-in via the guide surface 16 is fixed and, in addition, the guide surface serving such that, via a pivoting movement 17 (see FIG. 4 and FIG. 6) of the plug-in part 6, the plug-in part 6 rests parallel on the guide surface 16,16*a*,16*b* or lies parallel to the guide surface 16,16*a*,16*b* and exerts a force FG counter to the spring force F1, whereby the plug-in part 6 can be removed from the opening 5 tool-free.

In the case where the plug-in part 6 is a conductor 2, the conductor 2 can accordingly be moved out of the clamping region of the clamping body 3 by a simple pivoting movement and can be pulled from the terminal box without resistance.

For the case where an embodiment of the clamping body 3 is implemented with just one spring arm 21, there is one guide surface 16 accordingly. For the case where the clamping body 3 is implemented with one first spring arm 21 and one second spring arm 22, which are arranged on the central part roughly at an angle of 120°, however, there are accordingly first and second guide surfaces 16*a*,16*b* for the plug-in part 6 to be plugged in.

According to FIG. 1, the clamping body 3 is formed with a first spring arm 21 and a second spring arm 22, which are arranged on the central portion 10 in a V-shape at an angular spacing of roughly 120°. During manufacture of the clamping body 3, the first part 13*a* is bent upwards almost vertically and the respective adjoining second part 13*b* is bent downwards again respectively such that the respective free end 15 opposes the contact surface portion 14 likewise bent upwards almost vertically from the central portion 10. The respective downwardly bent second parts 13*b* form in the opening 5 the first and the second guide surfaces 16*a*,16*b* for the plug-in part 6 to be plugged in. The respective first part 13*a* of the respective first spring arm 21 or of the second spring arm 22 exerts a spring force F1 respectively in the direction of the contact surface portion 14.

For tool-free removal of a plug-in part once it has been plugged-in, the guide surfaces 16*a*,16*b* serve such that via a pivoting movement 17 of the plug-in part 6, the plug-in part 6 lies parallel to the guide surfaces 16*a*,16*b*, and due to the pivoting movement, exerts a force FG counter to the spring forces F1 on the respective first parts 13*a* of the first spring arm 21 or of the second spring arm 22, whereby the plug-in part can be removed from the opening 5 tool-free.

Figure 2:
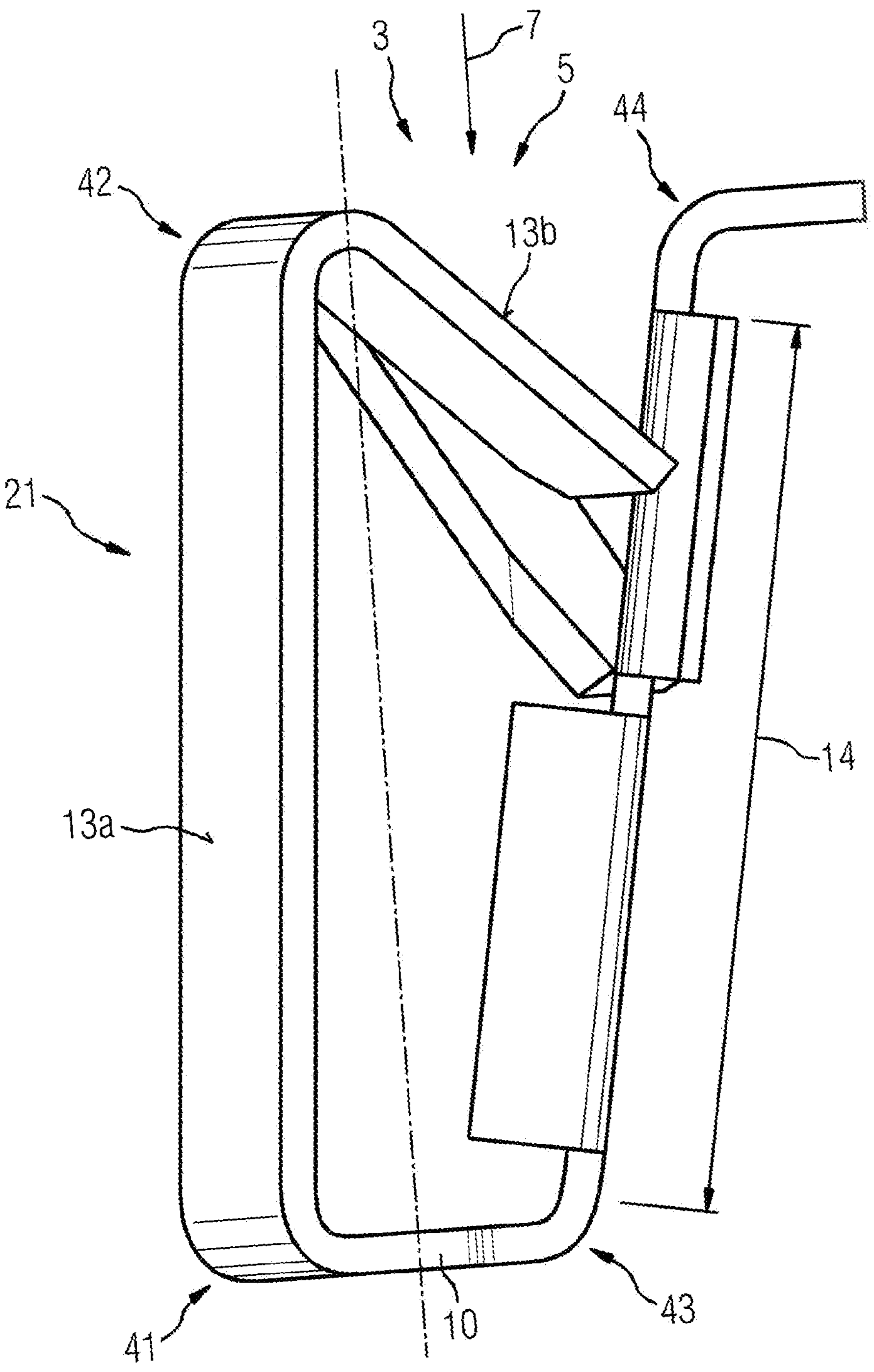
FIG. 2 shows a side view of the clamping body of FIG. 1.

FIG. 2 is a three-dimensional perspective representation of the clamping body 3 of FIG. 1 in a side view. A dot-dash reference line is intended to clarify the almost vertical bending upwards of the spring arm portions 13 or the first spring arm 21 and the second spring arm 22. The spring arm portion 13 arranged on the central portion 10 is bent upwards almost vertically at the first bending line 41' (see FIG. 7), with the almost vertical upward bending necessarily including an overbending above an angle of 90°. The second part 13*b* adjoining the first part 13*a* is bent downwards again at the second bending line 42' (see FIG. 7) such that the free end 15 opposes the contact surface portion 14 likewise bent upwards almost vertically from the central portion 10. The bending processes at the bending lines 41',42',43',44' represented by FIG. 7 produce a first bending arc 41, a second bending arc 42, a third bending arc 43 and a fourth bending arc 44 on the clamping body 3 of FIG. 2.

Figure 3:
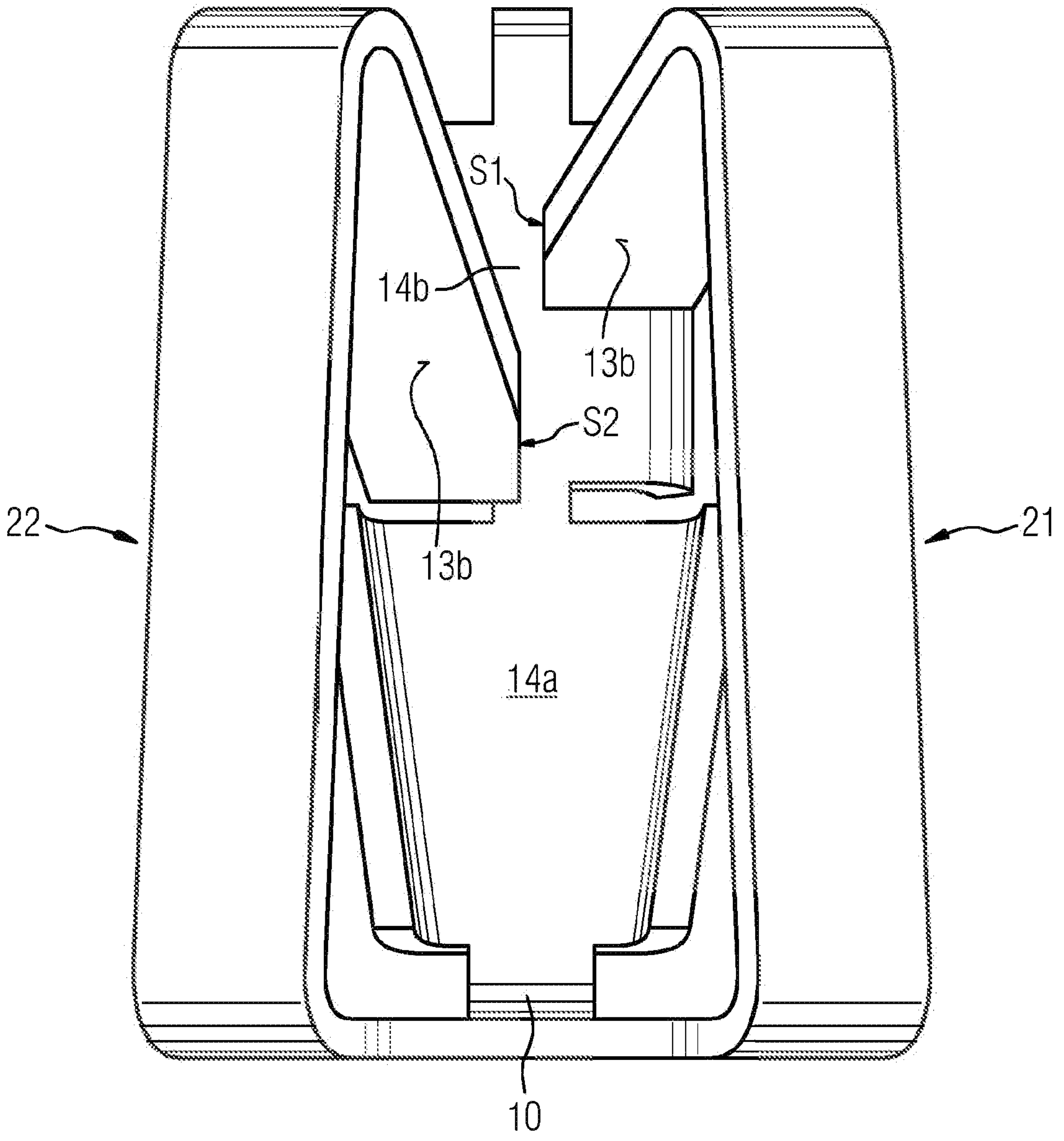
FIG. 3 shows a plan view of the clamping body of FIG. 1.

FIG. 3 represents a plan view of the clamping body 3. In addition to the known parts, FIG. 3 illustrates the contact surface portion 14 once again, which is divided into a first contact surface portion 14*a* and a second contact surface portion 14*b*. The first contact surface portion 14*a* is also bent at its ends to form a tough/rigid shape such that a subsequently plugged-in conductor 2 cannot slip to the side. The second contact surface portion 14*b* is bent counter to a trough in order to guarantee additional stability, in particular with regard to a subsequently used insulating chamber 30 around the clamping body 3.

FIG. 3 also illustrates one embodiment of the clamping body 3, which refers to the fact that the second part 13*b* of the first spring arm 21 is shorter than the second part of the second spring arm 22 and consequently the respectively free ends 15 oppose the contact surface portion 14 likewise bent upwards almost vertically from the central portion 10 at different locations S1,S2. The second part 13*b* of the first spring arm 21 accordingly is at a first location S1 and the second part 13*b* of the second spring arm 22 is at a second location S2, with the first location S1 being arranged higher than the second location S2 in relation to the conductor 2 to be plugged in.

Figure 4:
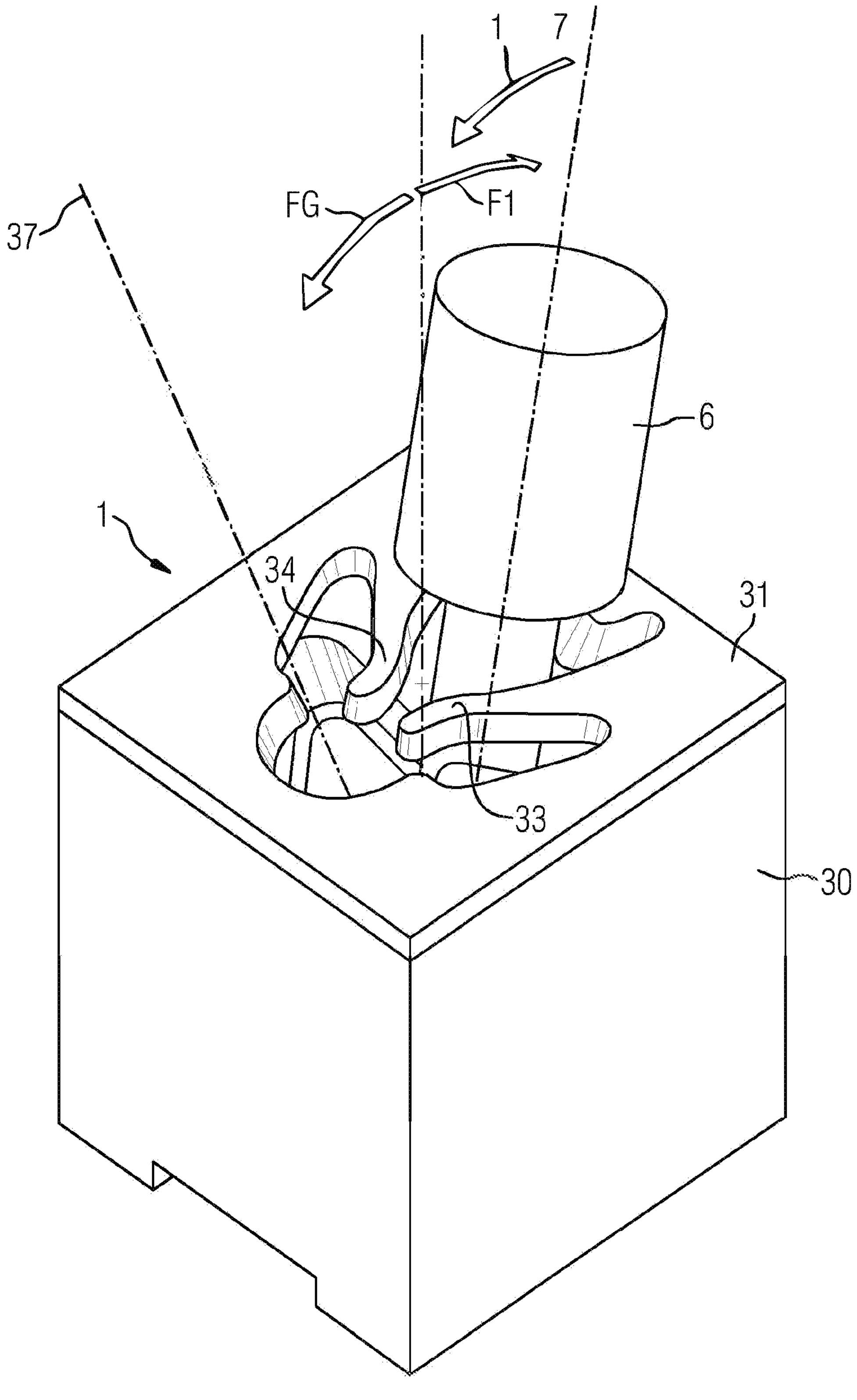
FIG. 4 shows a connecting terminal with an insulating chamber and a cover and plugged-in plug-in part in the form of a wire sleeve.

FIG. 4 shows a connecting terminal 1 for an electrical conductor 2 or a plug-in part 6. The connecting terminal 1 has a clamping body 3 according to FIGS. 1 to 3. The clamping body 3 is surrounded by an insulating chamber 30, with a cover 31 being arranged on the insulating chamber 30 over the opening 5 of the clamping body 3 and the cover 31 having a recess 32 with a circumferential line 35 (see FIG. 5). The cover 31 with its incorporated recess 32 in the form of a sliding block guide serves such that with a pivoting movement 17 of the plug-in part 6, once the spring forces F1 due to the counterforce FG of the plug-in part 6 have been overcome, the plug-in part 6 slides through a first web 33 and a second web 34 and thereafter is held in the oblique position 37 by the webs 33 and 34.

Figure 5:
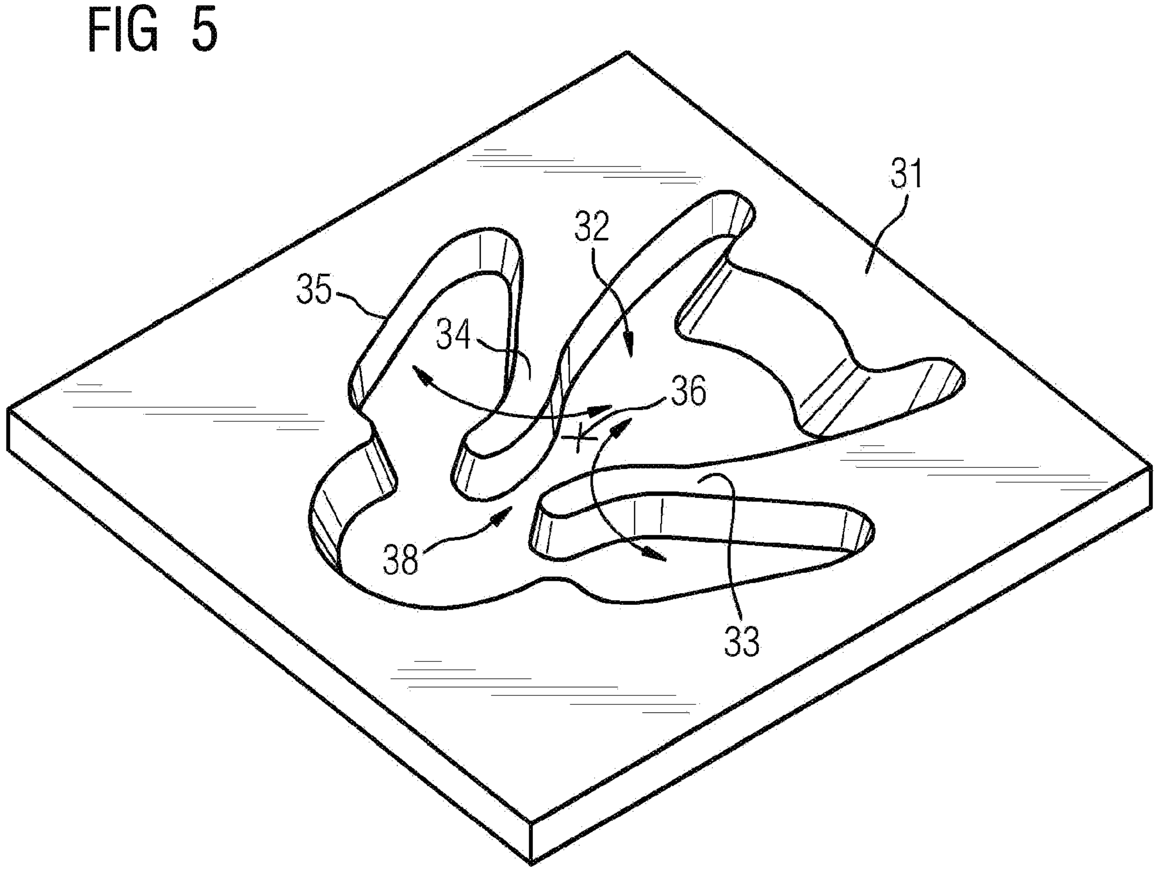
FIG. 5 shows the cover of FIG. 4 in a detailed representation to illustrate an opening in the cover, which helps a user to handle the terminal correctly.

FIG. 5 is intended to illustrate the pivoting process described with FIG. 4 once again. FIG. 5 shows the cover 31 with the recess 32 that has the circumferential line 35. Starting from the circumferential line 35, a first tapering web 33 and a tapering second web 34 are arranged in the direction of a center point 36 of the recess 32 in a V-shape such that with a pivoting movement 17 of the plugged-in conductor 2, the first web 33 and the second web 34 are widened by the conductor 2 and when the conductor 2 is no longer between the webs 33,34 they snap back and hold the conductor 2 in an oblique position 37, achieved by the pivoting movement, for easy removal. The first web 33 and the second web 34 more or less form a one-way street or conduit for the pivoted conductor 2. A blocking system is formed for the conductor 2: once moved through the two webs 33,34, it can no longer go back.

FIG. 6 once again illustrates the conductor 2 plugged in the clamping body 3 which, due to a pivoting movement 17, exerts a force on the respective second parts 13*b* of the respective spring arms 21,22 and thus enables subsequent removal. A pivot point of the conductor 2 is accordingly located at the lower end of the first contact surface portion 14*a*.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clamping body with an opening for a plug-in part, said clamping body being formed from an integral sheet-metal punched part by bending processes;

wherein the sheet-metal punched part has a central portion upon which a spring arm portion is arranged on a first side and a contact surface portion is arranged on a second side, wherein, starting from the central portion, the spring arm portion is formed as a first spring arm and a second spring arm, which are arranged on the central portion in a V-shape, the first and second spring arms being divided into a first part and an adjoining second part respectively with a respective free end, and the respective first part being bent upwards almost vertically and the respective adjoining second part being arranged bent downwards such that the respective free end opposes the contact surface portion which is bent upwards almost vertically from the central portion, wherein respective adjoining downwardly bent second parts in the opening form first and second guide surfaces into which the plug-in part plugged, the respective first part exerts a spring force respectively in a direction of the contact surface portion, whereby the plug-in part plugged in via the guide surfaces is fixed; and wherein the second part of the first spring arm is shorter than the second part of the second spring arm such that the respectively free ends oppose the contact surface portion which is likewise bent upwards almost vertically from the central portion at different locations.

2. The clamping body as claimed in claim 1, wherein the free end or the free ends is or are sharp-edged.

3. A connecting terminal for an electrical conductor as a plug-in part, comprising the clamping body as claimed in claim 1, the connecting terminal having:

an insulating chamber in which the clamping body is arranged; and a cover arranged on the insulating chamber over the opening, the cover having a recess with a circumferential line;

wherein, starting from the circumferential line, a first web tapering in a direction of a center point of the recess and a tapering second web are arranged in a V-shape such that, with a pivoting movement of the plugged-in conductor, the first web and the second web are widened by the conductor and when the conductor is no longer located between the webs the first web and the second web snap back and hold the conductor in an oblique position, achieved by the pivoting movement, for ease of removal.

4. A connecting terminal for an electrical conductor as a plug-in part, comprising the clamping body as claimed in claim 2, the connecting terminal having:

an insulating chamber in which the clamping body is arranged; and a cover arranged on the insulating chamber over the opening, the cover having a recess with a circumferential line;

wherein, starting from the circumferential line, a first web tapering in a direction of a center point of the recess and a tapering second web are arranged in a V-shape such that, with a pivoting movement of the plugged-in conductor, the first web and the second web are widened by the conductor and when the conductor is no longer located between the webs the first web and the second web snap back and hold the conductor in an oblique position, achieved by the pivoting movement, for ease of removal.

* * * * *